United States Patent
Ogura et al.

(10) Patent No.: US 8,337,027 B2
(45) Date of Patent: Dec. 25, 2012

(54) LIGHT SOURCE UNIT AND PROJECTOR

(75) Inventors: Naotsugu Ogura, Hamura (JP); Masahiro Ogawa, Ome (JP); Hideki Nakamura, Hamura (JP); Takeshi Miyazaki, Fussa (JP); Hiroki Masuda, Fussa (JP); Yasuyuki Kawakami, Abiko (JP)

(73) Assignees: Casio Computer Co., Ltd., Tokyo (JP); Stanley Electric Co., Ltd., Tokyo (JP)

( * ) Notice: Subject to any disclaimer, the term of this patent is extended or adjusted under 35 U.S.C. 154(b) by 296 days.

(21) Appl. No.: 12/872,173

(22) Filed: Aug. 31, 2010

(65) Prior Publication Data

US 2011/0051102 A1 Mar. 3, 2011

(30) Foreign Application Priority Data

Aug. 31, 2009 (JP) .................................. 2009-200267

(51) Int. Cl.
*G03B 21/20* (2006.01)
*G03B 21/14* (2006.01)
*G03B 21/26* (2006.01)
*F21V 9/16* (2006.01)

(52) U.S. Cl. ................. 353/85; 353/31; 353/94; 353/84; 362/84; 362/260

(58) Field of Classification Search ..................... 353/85, 353/31, 94, 84; 362/84, 260
See application file for complete search history.

(56) References Cited

U.S. PATENT DOCUMENTS 8,231,227 B2 * 7/2012 Kurosaki ........................ 353/31
2012/0062857 A1 * 3/2012 Saitou et al. .................... 353/98

FOREIGN PATENT DOCUMENTS

| JP | 2004-220015 A | 8/2004 |
| JP | 2004-341105 A | 12/2004 |
| JP | 2008-052070 A | 3/2008 |

* cited by examiner

*Primary Examiner* — Georgia Y Epps
*Assistant Examiner* — Magda Cruz
(74) *Attorney, Agent, or Firm* — Holtz, Holtz, Goodman & Chick, PC

(57) ABSTRACT

A light source unit including an excitation light source for emitting light in a blue wavelength band, a fluorescent wheel, a light emitting device for emitting light in a red wavelength band and a light guiding optical system for guiding light emitted from the fluorescent wheel and the light emitting device to a light guiding device. The fluorescent wheel has a fluorescent area where a green fluorescent material layer for emitting fluorescent light in a green wavelength band is disposed and a diffuse area for converting light emitted from the excitation light source into diffuse light of which directivity is weak are disposed end to end in a circumferential direction. A concentration of weight content of the green fluorescent material and a thickness thereof are such that a luminescent intensity of fluorescent light emitted from the green fluorescent material layer is enhanced.

10 Claims, 8 Drawing Sheets

LIGHT SOURCE UNIT AND PROJECTOR

CROSS-REFERENCE TO RELATED APPLICATIONS

This application is based upon and claims the benefit of priority under 35 USC 119 of Japanese Patent Application No. 2009-200267 filed on Aug. 31, 2009, the entire disclosure of which, including the description, claims, drawings and abstract thereof, is incorporated herein by reference.

BACKGROUND OF THE INVENTION

1. Field of the Invention

The present invention relates to a light source unit which includes a fluorescent wheel and a projector which includes the light source unit.

2. Description of the Related Art

In these days, data projectors are used on many cases as image projection apparatuses which project screens and video images of personal computers and further images based on image data stored in memory cards on to a screen. These projectors are such that light emitted from a light source is concentrated to a micromirror device called DMD (Digital Micromirror Device) or a liquid crystal plate for display a color image onto the screen.

In projectors of the type described above, conventionally, projectors using a high-intensity discharge lamp as a light source have been the mainstream of projectors. In recent years, however, there have been made many developments and proposals on light source unit which use, as a light emitting device of a light source unit, a semiconductor light emitting device such as a light emitting diode (LED), a laser diode (LD), or a device utilizing organic EL technology.

For example, Japanese Unexamined Patent Publication No. 2004-220015 (JP-A-2004-220015) proposes a light source unit including the light emitting devices in which the light emitting devices are disposed in a matrix-like configuration in order to increase the quantity of light. However, in the invention described in the patent document, the number of bright points of the light emitting devices is increased, and this causes a problem that the light utilization efficiency of light emitted from the respective light emitting diodes is reduced due to the Etendue value of the light source which is expressed by a product of light emitting area and solid angle becoming larger than the Etendue value of the display device which is expressed by a product of the area of the display device and solid angle.

To solve this problem, Japanese Unexamined Patent Publication No. 2004-341105 (JP-A-2004-341105) and Japanese Unexamined Patent Publication No. 2008-52070 (JP-A-2008-52070) disclose projectors in which excitation light is shone onto a fluorescent material layer so that fluorescent light emitted from the fluorescent material layer is used as light source light.

In the invention described in Japanese Unexamined Patent Publication No. 2004-341105 (JP-A-2004-31105) and Japanese Unexamined Patent Publication No. 2008-52070 (JP-A-2008-52070), the projector includes the light source unit in which the excitation light is shone to fluorescent material layer and which uses fluorescent light emitted from the fluorescent material layer as light source light. Projectors require light source unites which can emit light of high-luminance and high-intensity, and such light can be emitted by increasing the quantity of excitation light. However, using a plurality of excitation light sources to increase the quantity of excitation light leads to an increase in heat value and an increase in consumed power. In addition, such an attempt also leads to an increase in size of a main body of a projector.

SUMMARY OF THE INVENTION

An object of the invention is to provide a light source unit which can emit light of high luminance and high intensity without increasing the quantity of excitation light by determining a concentration of weight content of a fluorescent material in a fluorescent material layer and a thickness of the fluorescent material layer so that luminescence intensity is enhanced when excitation light in a predetermined wavelength band is shone onto the fluorescent material layer in the way described above and a projector which includes the light source unit.

The light source unit of the invention includes an excitation light source for emitting light in a predetermined wavelength band and a fluorescent plate including at least one or more fluorescent material layers for emitting fluorescent light in a predetermined wavelength band using light emitted from the excitation light source as excitation light, wherein the fluorescent material layer is formed of a fluorescent material and a binder in which the fluorescent material is dispersed uniformly, wherein at least a green fluorescent material layer is formed on the fluorescent plate as the fluorescent material layer, and wherein a concentration of weight content of a green fluorescent material in the green fluorescent material layer is in the range from 60% to 85%.

In the light source unit of the invention, the excitation light source is a solid-state light emitting device which emits light in a blue wavelength.

Further, in the light source unit of the invention, the thickness of the green fluorescent material layer is in the range from 100 μm to 300 μm.

Additionally, in the light source unit of the invention, the concentration of weight content of the green fluorescent material in the green fluorescent material layer is preferably in the range from 70% to 80%.

In addition, in the light source unit of the invention, the thickness of the green fluorescent material layer is preferably in the range from 150 μm to 200 μm.

In the light source unit of the invention, the green fluorescent material in the green fluorescent material layer is a cerium-activated garnet phosphor, and a peak of a wavelength of the fluorescent light is in the range from 520 nm to 540 nm.

In addition, in the light source unit of the invention, the excitation light source is a blue laser diode which emits light in a blue wavelength band of which a peak of a wavelength is in the range from 430 nm to 460 nm.

In the light source unit of the invention, the fluorescent plate is configured as a fluorescent wheel in which a segment where the green fluorescent material layer is disposed and a segment functioning as a diffusing area where light emitted from the excitation light source is converted into diffuse light whose directivity is weak are provided end to end in a circumferential direction, and the light source unit has a red light emitting diode functioning as a light emitting device which emits light in a red wavelength and includes a light guiding optical system which guides fluorescent light and diffuse light which are emitted from the fluorescent wheel and light emitted from the light emitting device to a predetermined plane.

In the light source unit of the invention, the fluorescent plate may be configured as a fluorescent wheel in which a segment functioning as a fluorescent area which is made up of the green fluorescent material layer and a red fluorescent material layer which receives excitation light from the excitation light source to emit fluorescent light in a red wavelength band and a segment functioning as a diffuse area where light emitted from the excitation light source is converted into diffuse light whose directivity is weak are disposed end to end in a circumferential direction, and the light source unit includes a light guiding optical system which guides fluorescent light and diffuse light which are emitted from the fluorescent wheel to a predetermined plane.

The projector of the invention includes a light source unit, a light source side optical system, a light guiding device, a display device, a projection side optical system, and a projector control means. The light source unit is the light source unit that has been described above and is disposed so that light source light is gathered to an incident plane of the light guiding device.

According to the invention, there can be provided provide the light source unit which can emit light of high luminance and high intensity without increasing the quantity of excitation light by determining the concentration of weight content of the fluorescent material in the fluorescent material layer and the thickness of the fluorescent material layer so that luminescence intensity is enhanced when excitation light in the predetermined wavelength band is shone onto the fluorescent material layer and the projector which enables a projection of high luminance and high lightness by including the light source unit described above.

BRIEF DESCRIPTION OF THE DRAWINGS

The invention will be understood much sufficiently by reading the following detailed description thereof and referring to the accompanying drawings. However, the detailed description and the accompanying drawings are intended mainly to describe the invention and are not intended to limit the scope thereof. In the accompanying drawings.

DETAILED DESCRIPTION OF THE PREFERRED EMBODIMENT

Figure 1:
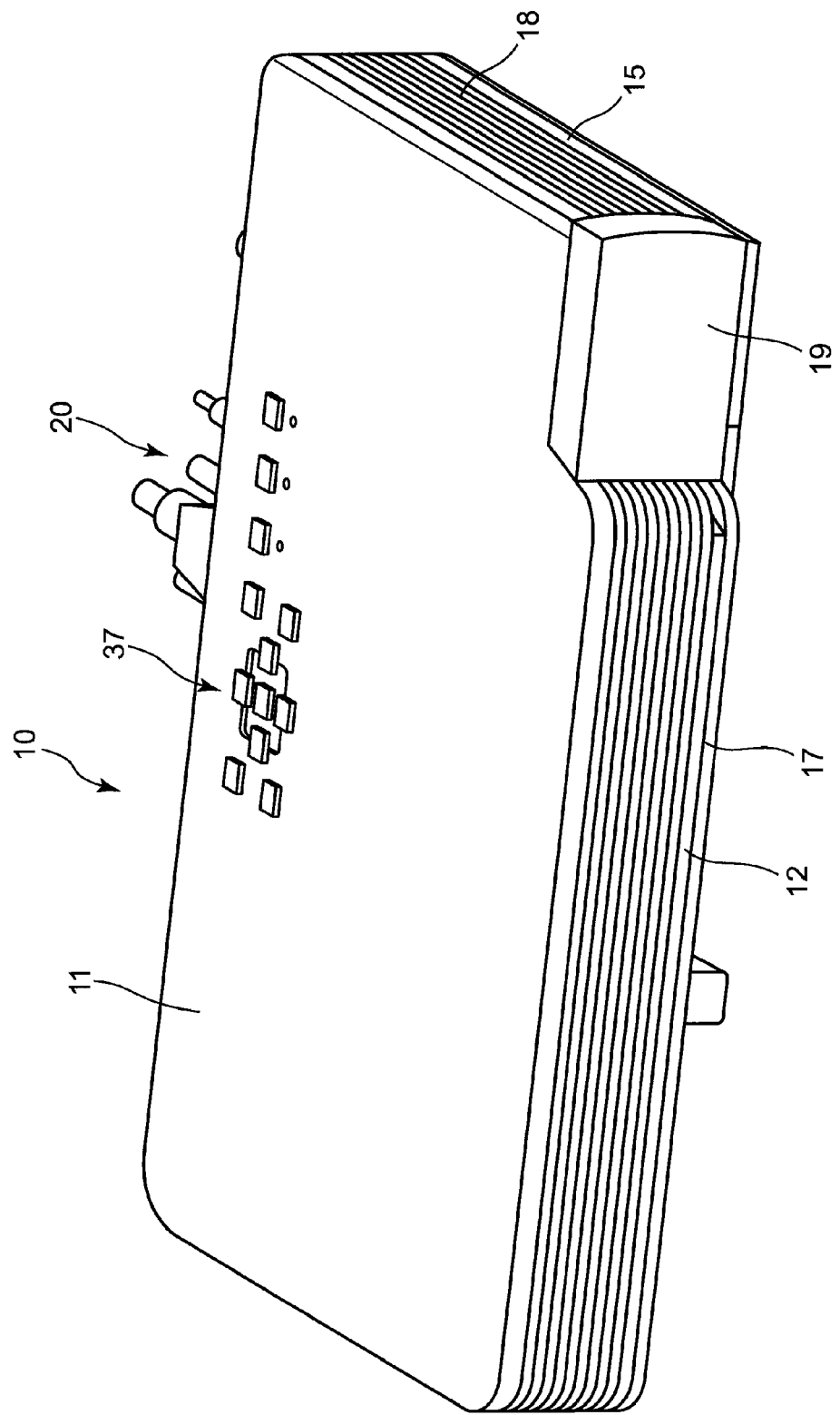
FIG. 1 is a perspective view showing an external perspective view of a projector including a light source unit according to an embodiment of the invention.

Hereinafter, a preferred mode for carrying out the invention will be described by use of the accompanying drawings. Although various limitations which are technically preferable for carrying out the invention are imposed on an embodiment which will be described below, the scope of the invention is not limited in any way to the following description and illustrated examples.

Hereinafter, an embodiment of the invention will be described. A projector 10 of the invention includes a light source unit 63, a light source side optical system 62, a light guiding device 75, a display device 51, a projection side optical system 90 and a projector control unit. The light source unit 63 is disposed so that light source light is gathered to an incident plane of the light guiding device 75.

In addition, the light source unit 63 includes an excitation light source 72 which emits light in a blue wavelength band, a fluorescent wheel 71 as a fluorescent plate, a red light emitting diode as a light emitting device 74 which emits light in a red wavelength band and a light guiding optical system for gathering light emitted from the fluorescent wheel 71 and light emitting from the light emitting device 74 so as to guide them onto a predetermined plane, that is, an incident plane of the light guiding device 75.

In this fluorescent wheel 71, a fluorescent emitting area 2 on which a green fluorescent material layer 4 is disposed which emits fluorescent light in a green wavelength band using light emitted from the excitation light source 72 as excitation light and a diffuse area 1 where light emitted from the excitation light source 72 is converted into diffuse light whose directivity is weak are provided end to end in a circumferential direction.

The green fluorescent material layer 4 is formed of a green fluorescent material and a binder in which the green fluorescent material is dispersed uniformly. In addition, in the green fluorescent material layer 4, a concentration of weight content of the green fluorescent material in the green fluorescent material layer is determined so that the luminescence intensity of fluorescent light emitted from the green fluorescent material layer 4 is enhanced when light emitted from the excitation light source 72 is shone on to the green fluorescent material layer 4. Specifically, the concentration of weight content of the green fluorescent material in the green fluorescent material layer is determined to be in the range from 70% to 80%.

In addition, in the green fluorescent material layer 4, a thickness thereof is determined so that the luminescence intensity of fluorescent light emitted from the green fluorescent material layer 4 is enhanced when light emitted from the excitation light source 72 is shone onto the green fluorescent material layer 4. Specifically, the thickness of the green fluorescent material layer 4 is determined to be in the range from 150 μm to 200 μm.

In the light source unit 63 of the invention, the green fluorescent material layer 4 is formed using a cerium-activated garnet phosphor of which a peak of a wavelength of fluorescent light is in the range from 520 nm to 540 nm. In addition, the excitation light source 72 is configured as a blue laser diode which emits light in a blue wavelength band of which a peak of a wavelength is in the range from 430 nm to 460 nm.

Hereinafter, an embodiment of the invention will be described in detail by reference to the accompanying drawings.

FIG. 1 is a perspective view showing an external appearance of a projector 10. In this embodiment, left and right denote, respectively, left and right directions with respect to a projecting direction, and front and rear denote, respectively, front and rear directions with respect to a traveling direction of light beam.

As is shown in FIG. 1, the projector 10 has a substantially rectangular parallelepiped shape and has a lens cover 19 which covers a projection port which lies to a side of a front panel 12 which is referred to as a front side panel of a main body case, as well as a plurality of inside air outlet holes 17 in the front panel 12. Further, although not shown, the projector 10 includes an Ir reception part for receiving a control signal from a remote controller.

In addition, a keys/indicators part 37 is provided on an upper side panel 11 which constitute the main body case. Disposed on this keys/indicators part 37 are keys and indicators which include a power supply switch key, a power indicator which informs whether the power supply is on or off, a projection switch key which switches on or off projection, an overheat indicator which informs of an overheat condition when the light source unit, the display device or the control circuit overheats and the like.

Further, provided on a back side of a back side panel of the main body case are an input/output connectors part where USB terminals, an image signal input D-SUB terminal, an S terminal, an RCA terminal and the like are provided and various types of terminals 20 including a power supply adaptor plug and the like. A plurality of outside air inlet holes 18 are formed in proximity to respective lower portions of a right-hand side panel 14 which configures a side panel, not shown, of the main body case and a left-hand side panel 15 which is a side panel shown in FIG. 1.

Figure 2:
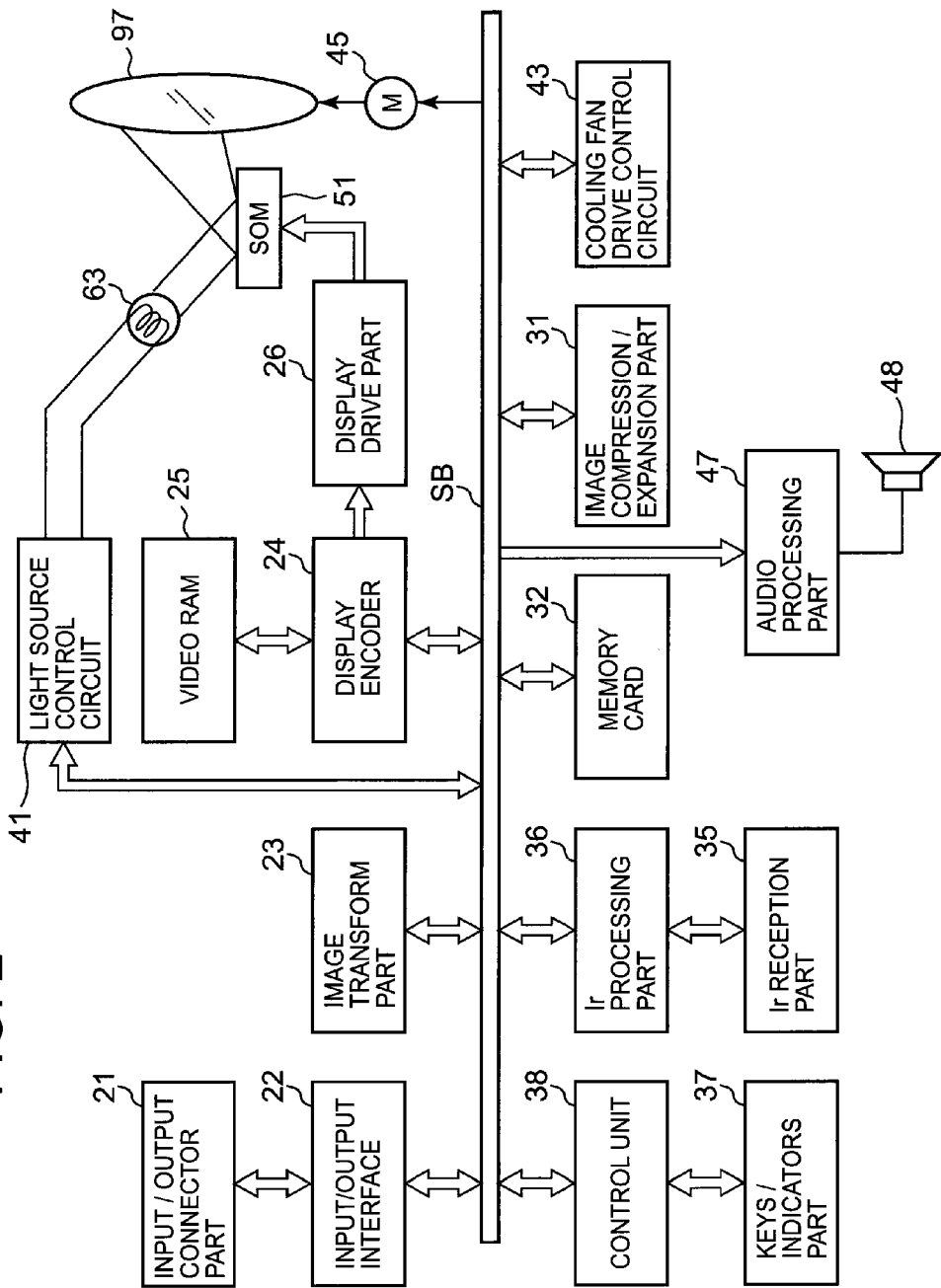
FIG. 2 is a functional circuit block diagram of the projector including the light source unit according to the embodiment of the invention.

Next, a projector control means for the projector 10 will be described by use of a block diagram in FIG. 2. The projector control means is made up of a control unit 38, an input/output interface 22, an image transform part 23, a display encoder 24, a display drive part 26 and the like.

The control unit 38 is such as to govern operations of respective operations of circuitries within the projector 10 and is made up of a CPU, a ROM which stores in a fixed fashion operation programs of various types of settings and a RAM which is used as a work memory.

Image signals of various standards that are inputted from the input/output connector part 21 are sent via the input/output interface 22 and a system bus (SB) to the image transform part 23 where the image signals are transformed so as to be unified into an image signal of a predetermined format which is suitable for display, and are thereafter outputted to the display encoder 24.

In addition, the display encoder 24 deploys the image signal inputted thereinto on a video RAM 25 for storage and generates a video signal from the contents stored in the video RAM 25, outputting the video signal so generated to the display drive part 26.

The display drive part 26 functions as a display device control means, and drives a display device 51 which is a spatial optical modulator (SOM) at an appropriate frame rate in accordance with the image signal outputted from the display encoder 24. A pencil of light emitted from a light source unit 63 is caused to enter the display device 51, which is controlled by the display drive part 26, via a light source side optical system to thereby form an optical image by reflected light reflected at the display device 51, and the optical image so formed can be projected on to a screen, not shown, for display via a projection side optical system 90, which will be described later. A movable lens group 97 of the projection side optical system 90 is driven by a lens motor 45 for zooming or focusing.

In addition, when in a reproducing mode, the image compression/expansion part 31 reads out image data recorded on the memory card 32 and expands individual image data which make up a series of time-varying images frame by frame. Then, the image compression/expansion part 31 performs on operation in which the image data is outputted to the display encoder 24 via the image transform part 23 so as to enable the display of time-varying images on the based on the image data stored on the memory card 32. In the projector 10 of this embodiment, a configuration may be adopted in which a card slot is provided in a housing of the projector 10 into which the memory card 32 is inserted or a configuration may be adopted in which the memory card 32 as a USB memory is inserted into the input/output connectors part 21.

Operation signals from at the keys/indicators part 37 which is made up of the main keys and indicators provided on the upper side panel 11 of the main body case are sent out directly to the control unit 38, while key operation signals from the remote controller are received by the Ir reception part 35, and a code signal demodulated at an Ir processing part 36 is outputted to the control unit 38.

In addition, an audio processing part 47 is connected to the control unit 38 via the system bus (SB). This audio processing part 47 includes a sound source circuit such as a PCM sound source. When in a projection mode and a reproducing mode, the audio processing part 47 converts audio data into analog signals and drives a speaker 48 to output loudly sound or audio based on the audio data.

Additionally, the control unit 38 controls a light source control circuit 41 as a light source control means, and this light source control circuit 41 controls the light source unit 63 so that light in a predetermined wavelength band is emitted from the light source unit 63 which is required when reproducing image. Further, the control unit 38 causes a cooling fan drive control circuit 43 to detect temperatures through a plurality of sensors which are provided at the light source unit 63 and the like so as to control the rotational speed of the cooling fan based on the results of the temperature detection. In addition, the control unit 38 also causes the cooling fan drive control circuit 43 to make the cooling fan continue to rotate even after the power supply of the projector main body is switched off by use of a timer or the like or to make the power supply to the projector main body to be cut off depending upon the results of the temperature detection by the temperature sensors.

Figure 3:
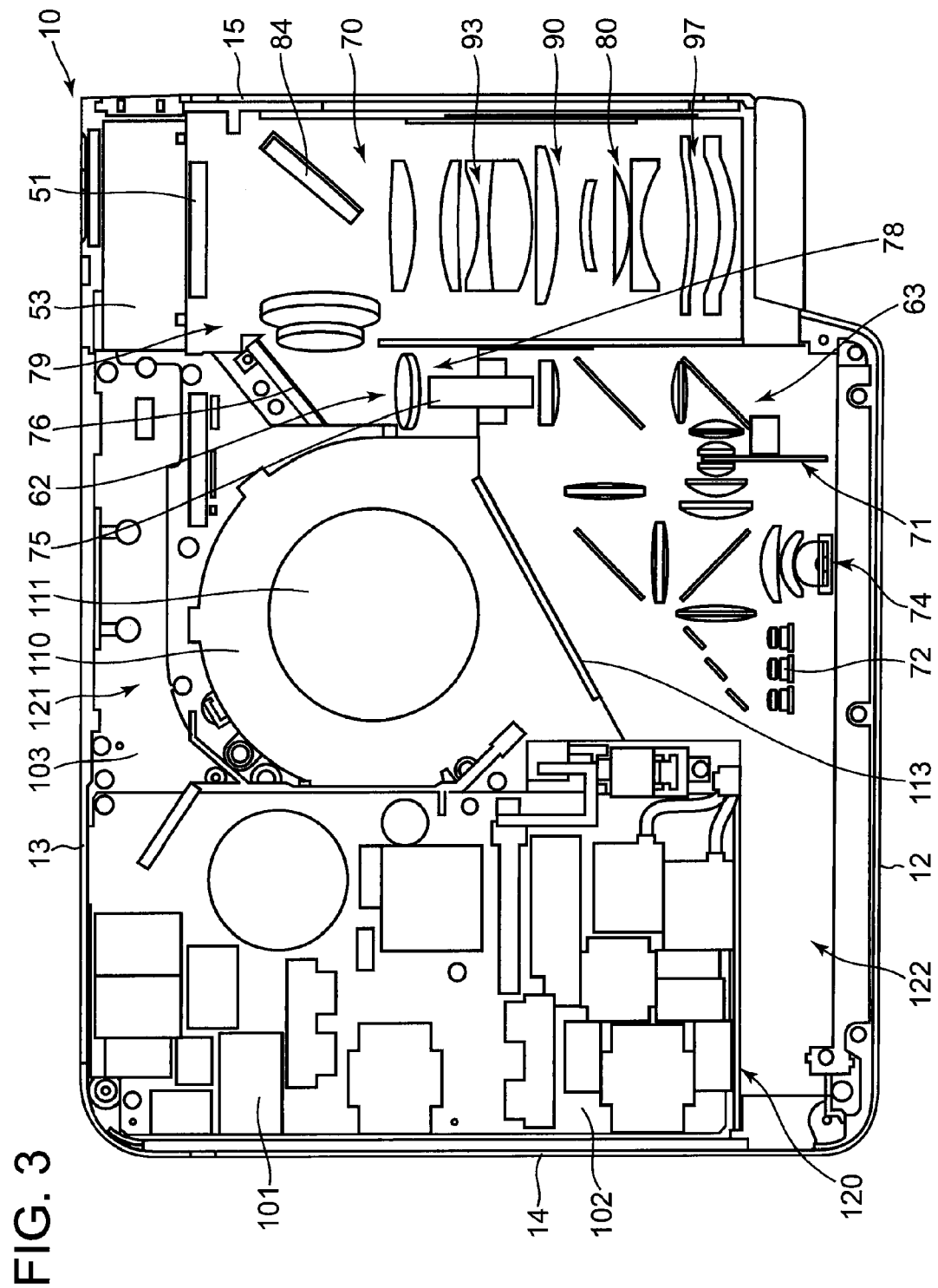
FIG. 3 is an exemplary plan view showing an internal construction of the projector including the light source unit according to the embodiment of the invention.

Next, an internal construction of the projector 10 will be described. FIG. 3 is an exemplary plan view showing an internal construction of the projector 10. As is shown in FIG. 3, in the projector 10, a power supply control circuit board 102 on which a power supply circuit block 101 and the like are mounted is disposed in proximity to the right-hand side panel 14 and a sirocco fan-type blower 110 is disposed substantially at a center in the projector 10. In addition, a control circuit board 103 is disposed in proximity to the blower 110, and the light source unit 63 is disposed in proximity to the front panel 12, and an optical system unit 70 being disposed in proximity to the left-hand side panel 15.

Additionally, an interior of the housing of the projector 10 is divided airtightly into an inlet side space compartment 121 which lies on the back panel 13 side and an outlet side space compartment 122 which lies on the front panel 12 side by a partitioning bulkhead 120. The blower 110 is disposed so that its inlet port 111 is positioned in the inlet side space compartment 121 and its outlet port 113 is positioned on a boundary between the outlet side space compartment 122 and the inlet side space compartment 121.

The optical system unit 70 has a substantially U-shape and is made up of three blocks such as an illumination side block 78 which is positioned in proximity to the light source unit 63, an image generation block 79 which is positioned on the back panel 13 side, and a projection side block 80 which is positioned between the illumination side block 78 and the left-hand side panel 15.

The illumination side block 78 includes part of a light source side optical system 62 which guides light emitted from the light source unit 63 to the display device 51 which is possessed by the image generation block 79. A light smoothing or light guiding device 75 for making light beam emitted from the light source 63 into light beam whose intensity is uniformly distributed and a light gathering lens which gathers light that has been transmitted through the light guiding device 75 are included in the light source side optical system 62 that is possessed by the illumination side block 78.

The image generating block 79 has, as the light source side optical system 62, an optical axis varying mirror 76 for varying a direction of an optical axis of the light beam emitted from the light guiding device 75, a plurality of light gathering lenses for gathering light reflected by the optical axis varying mirror 76 onto the display device 51 and a shining mirror 84 for shining the light beam that has been transmitted through the light gathering lenses on to the display device 51 at a predetermined angle. Further, the image generating block 79 includes a DMD which constitutes as the display device 51, and a display device heatsink or cooling device 53 for cooling the display device 51 is disposed on a back panel 13 side of the display device 51 to thereby prevent the display device 51 from being heated to a high temperature.

The projection side block 80 has a lens group which makes up a projection side optical system 90 which projects light on to the screen which is reflected by the display device 51 to form an image. The projection side optical system 90 is made into a variable focus lens made up of a fixed lens group 93 which is incorporated in a fixed lens barrel and a movable lens group 97 which is incorporated in a movable lens barrel and having a zooming function. This variable focus lens enables zooming and focusing operations by moving the movable lens group 97 by a lens motor.

Figure 4:
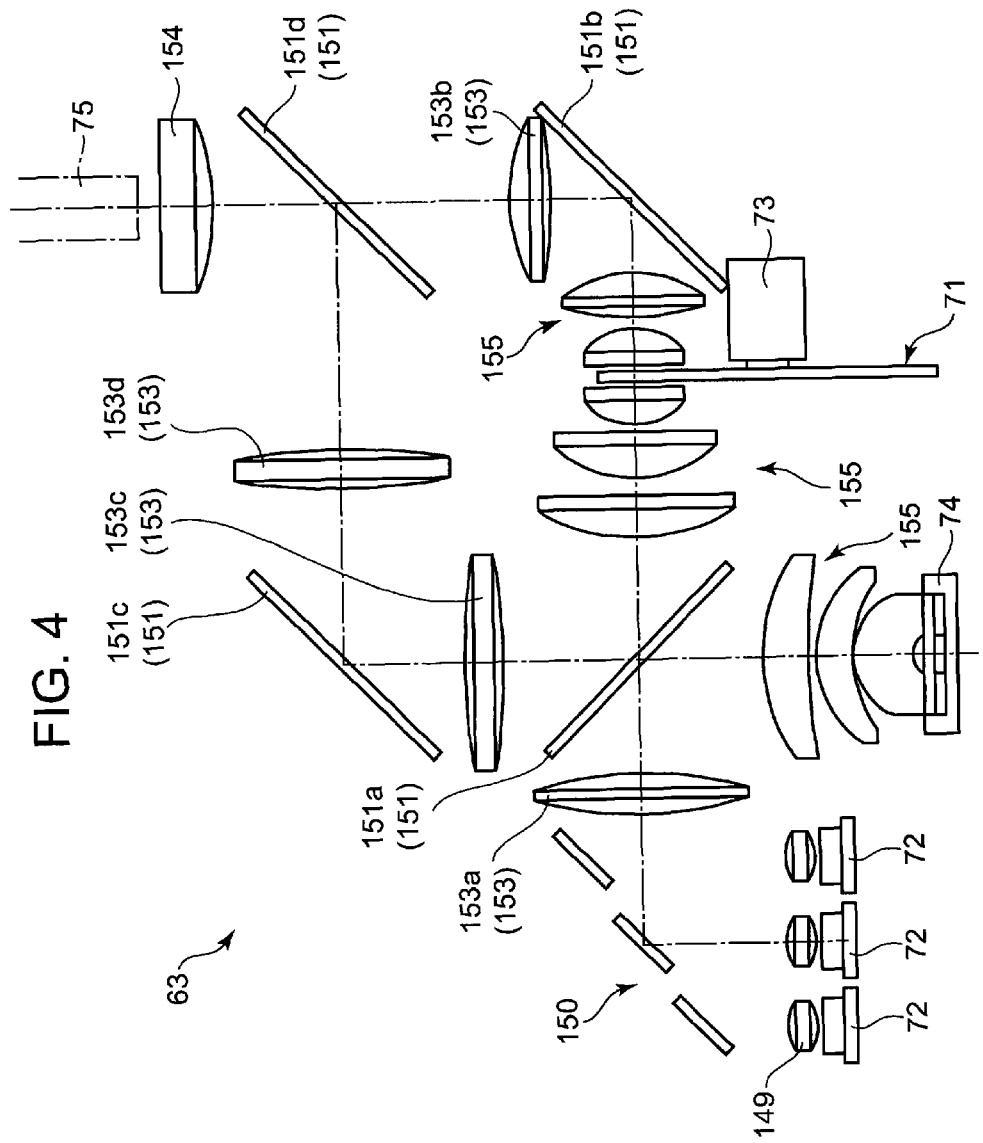
FIG. 4 is an exemplary plan view of the light source unit according to the embodiment of the invention.

Next, the light source unit 63 of the projector 10 according to the embodiment will be described. FIG. 4 is an exemplary plan view of the light source unit 63. As is shown in FIG. 4, the light source unit 63 includes a plurality of excitation light sources 72 which are disposed so that their optical axes become parallel to an axis of the light guiding device 75, a plurality of collimator lenses 149 which are disposed in front of the excitation light sources 72, and a reflecting mirror group 150 to vary the directions of optical axes of light beams that transmitted through the collimator lenses 149 at 90 degrees.

In addition, the light source unit 63 includes a fluorescent wheel 71 which is disposed on an optical axis of excitation light so that the optical axis and a rotating axis of excitation light reflected on the reflecting mirror group 150 becomes parallel to each other and a wheel motor 73 for driving to rotate the fluorescent wheel 71. The light source unit 63 includes further a red light source as a light emitting device 74 which is disposed so that an optical axis direction and an optical axis of excitation light become parallel to each other when it is emitted from the excitation light source 72 and a light guiding optical system for gathering light beam emitted from the optical wheel 71 and light beam emitted from the light emitting device 74 so that optical axes of the light beams are aligned with each other so as to be guided on to a predetermined plane.

In the excitation light sources 72, a plurality of blue laser emitters are arranged in a planar configuration to emit laser light in a blue wavelength band to the fluorescent wheel 71 as excitation light and light in a blue wavelength band in the light source unit 63. In addition, the collimator lenses 149 emit forward light emitted individually from the plurality of blue laser emitters of the excitation light sources 72 as parallel light in which the directivity is increased at the front of the blue laser emitters. Further, the reflecting mirror group 150 includes a plurality of strip-like reflecting mirrors which are arranged in a step-like fashion to reflect light rays emitted from the excitation light sources 72 so that optical axes of the light rays are deflected through 90 degrees.

Figure 5:
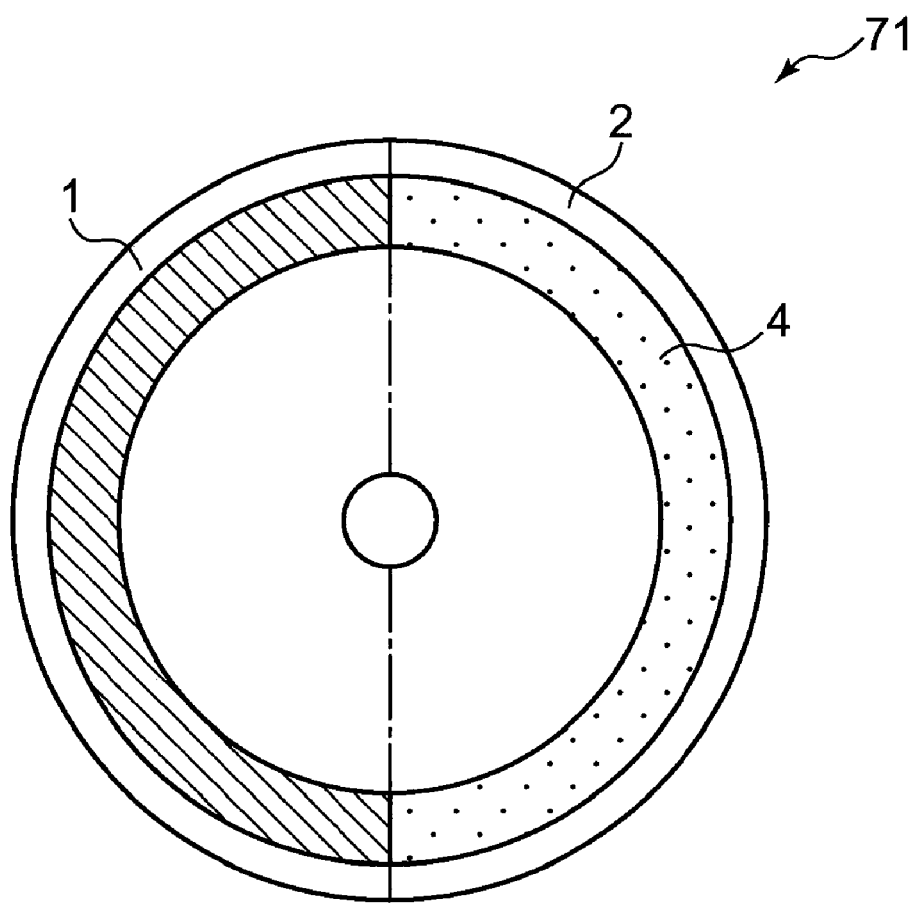
FIG. 5 is an exemplary front view of a fluorescent wheel according to the embodiment of the invention.

As is shown in FIG. 5, the fluorescent wheel 71 is a circular light emitting plate and is controlled to rotate by the wheel motor 73. The fluorescent wheel 71 includes a segment as a diffuse transmission area 1 which diffuses light emitted from the excitation light sources 72 and a segment as a fluorescent emitting area 2, which are provided end to end in a circumferential direction. This diffuse transmission area 1 is formed of a material such as glass having a high translucency, and the microasperity is applied to its surface by sand-blasting treatment. Then, light emitted from the excitation light sources 72 and shone on to the diffuse transmission area 1 is converted into diffuse light having a low directivity from laser light having a high directivity and is transmitted.

In the fluorescent emitting area 2, a reflecting surface is applied on a surface of a metallic material and the like by silver vapor deposition. Then, a transparent protection coating of such as magnesium fluoride (MgF2) is formed on a surface of the reflecting surface by spattering. A green fluorescent material layer 4 is disposed on a surface of the protection coating. This green fluorescent material layer 4 is formed of a binder such as a silicone resin having high heat resistance and high light transmissivity and a green fluorescent material which is uniformly dispersed in the binder. The green fluorescent material is a cerium-activated garnet phosphor, and $Y_3(Al, Ga)_5O_{12}:Ce^{3+}$ is preferably used.

Figure 6:
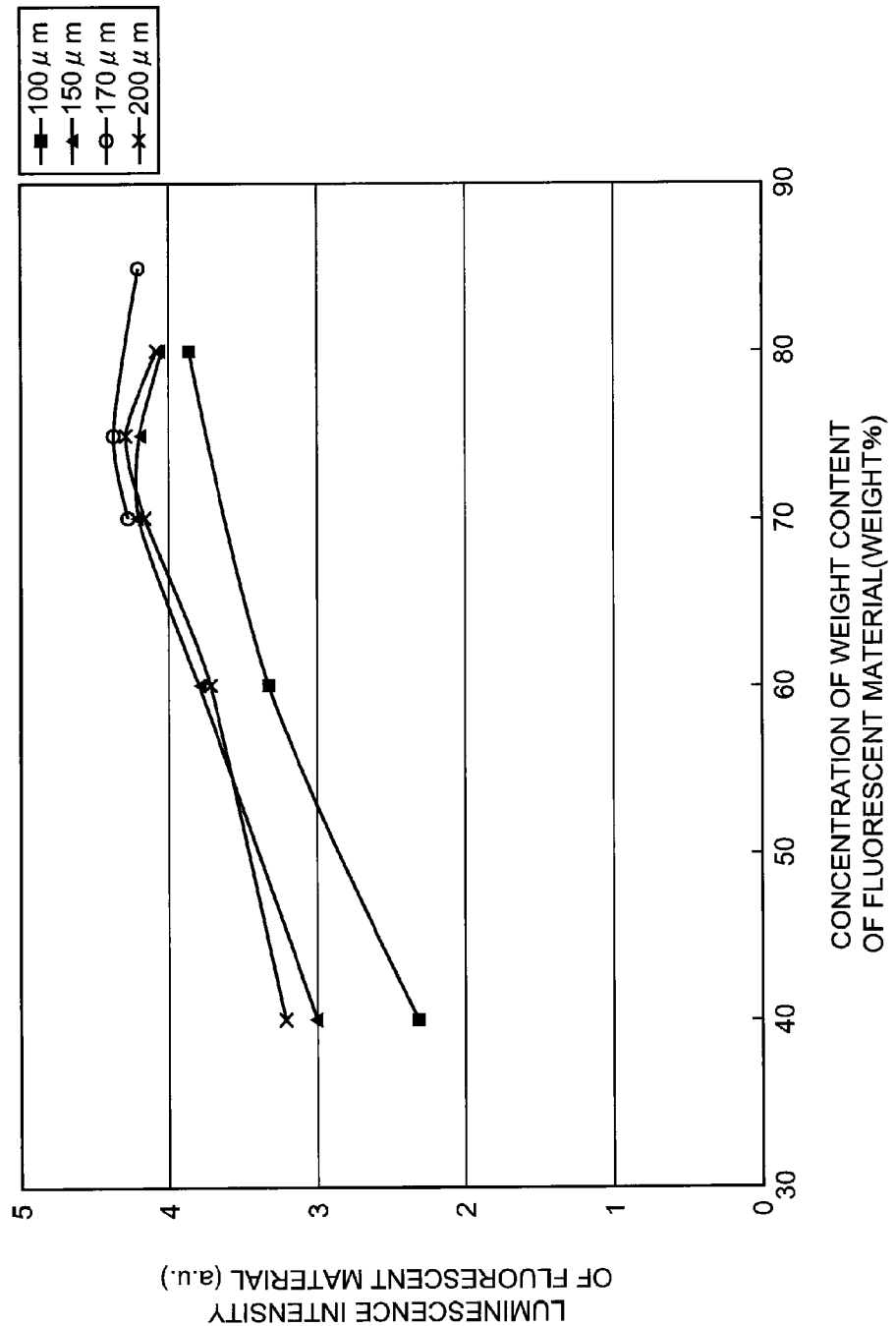
FIG. 6 is a graph showing a relationship between concentration of weight content of fluorescent material and luminescence intensity.

In this green fluorescent material layer 4, depending upon a concentration of weight content of the green fluorescent material in the binder and a thickness of the green fluorescent material, even in the event that the same excitation light is shone on thereto, there is caused a difference in luminescent intensity. FIG. 6 is a graph fluorescent material concentration of weight content on the axis of abscissas and luminescence intensity of fluorescent material on the axis of ordinate in a plural data of thicknesses. In FIG. 6, weight percent (wt %) is used as a unit for a concentration of weight content, and since a unit for luminescence intensity is arbitrary, the unit is referred to as arbitrary units (a.u.). In addition, as the thickness of the fluorescent material, there are used four data thicknesses of 100 μm, 150 μm, 170 μm and 200 μm.

As is shown in FIG. 6, a peak of luminescence intensity peaks at around 75% of the concentration of weight content, and as the concentration of weight content is increased to around the 75%, the luminescence intensity is enhanced in proportion to the concentration of weight content. In addition, the luminescence intensity starts to decrease gradually after passing the peak.

In this phenomenon, since the absolute amount of the fluorescent material which absorbs the excitation light for emitting is small, the luminescence intensity falls at the low concentration of weight content of the fluorescent material in the fluorescent material layer. Consequently, in the low concentration of weight content, a large quantity of light of the light emitted from the excitation light sources 72 and shone on to the green fluorescent material layer 4 which is not shone on to the fluorescent material and is emitted to outside thereof is increased, and the utilization efficiency of light emitted from the excitation light sources 72 is down.

Figure 7:
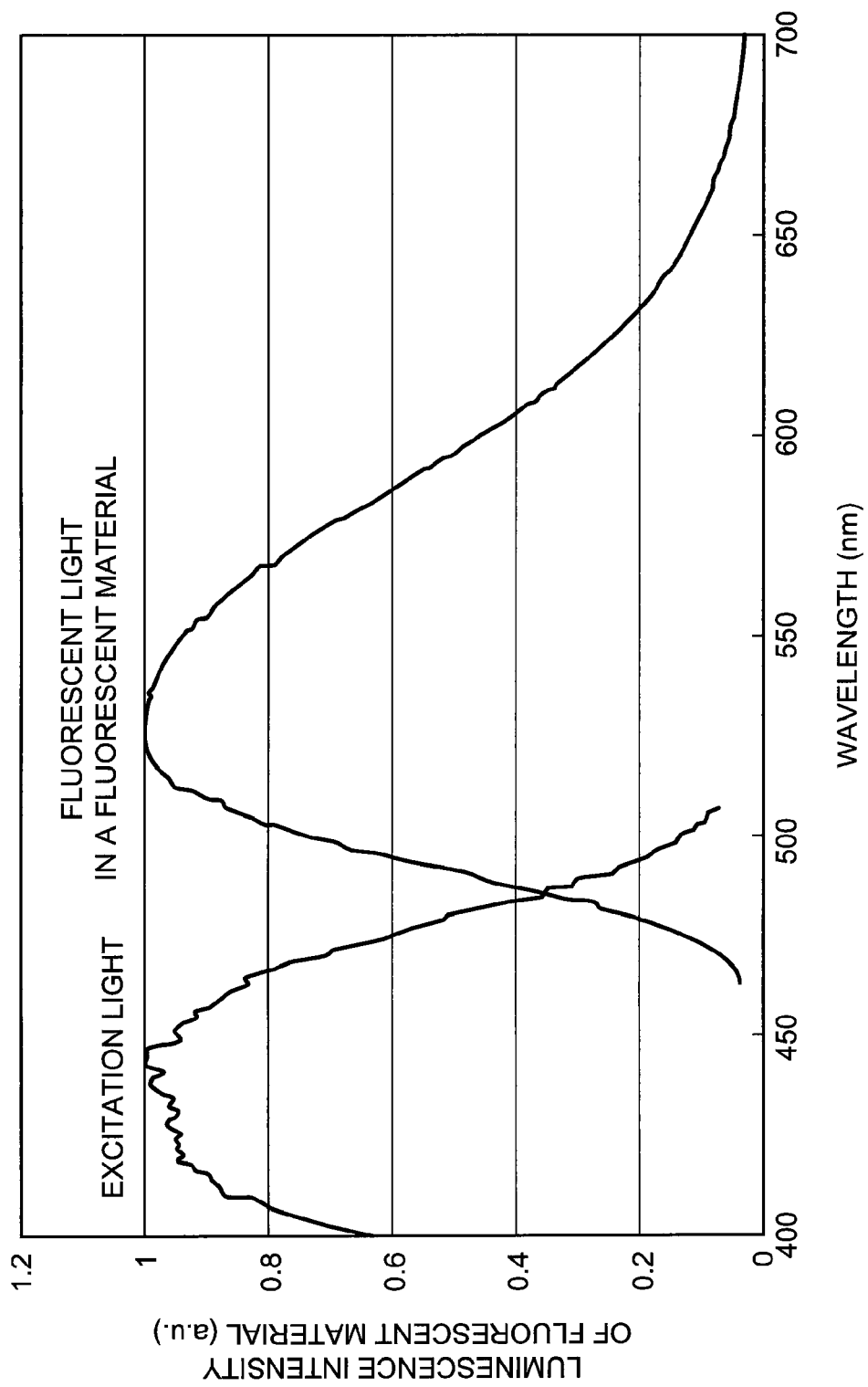
FIG. 7 is a graph showing a relationship between a wavelength of excitation light on the axis of abscissas and a wavelength of fluorescent light in a fluorescent material on the axis of ordinate.

In addition, the reason that the luminescence intensity is decreased in too high concentration of weight content is that, shown in FIG. 7, the light in a wavelength band of 460 nm to 520 nm is shone on to other fluorescent materials in the light emitted by the fluorescent material, and the light in such wavelength band is absorbed in the other fluorescent materials as excitation light, and hence, the quantity of fluorescent light which is emitted from the fluorescent material layer to outside thereof is decreased since the fluorescent material having a property that absorbs light in a wavelength band of up to near 510 nm to become luminous. Consequently, in too high concentration of weight content, the fluorescent light emitted by the fluorescent material is absorbed in an interior of the fluorescent material layer, whereby the utilization efficiency of light by fluorescent emission is decreased. FIG. 7 is a graph wavelength on the axis of abscissas and luminescence intensity of fluorescent material on the axis of ordinate.

In order to enhance the utilization efficiency of light emitted from the excitation light sources 72 and increase the luminescence intensity of fluorescent light by enhancing the utilization efficiency thereof, based on the characteristics of the cerium-activated garnet phosphor described above that the concentration of weight content is preferably in the range from 60% to 85% and is more preferably in the range from 70% to 80% in particular. Consequently, in the green fluorescent material layer 4 of this embodiment, the concentration of weight content of the green fluorescent material is set to around 75%.

In addition, with regard to the thickness of the green fluorescent material layer 4, as is shown in graph of FIG. 6, the luminescence intensity becomes the highest with the thickness thereof being set to around 170 µm. The reason that the luminescence intensity changes depending on the thickness of the layer is that in the event of the thickness of the green fluorescent material layer 4 being too thin, in the light emitted from the excitation light sources 72 and shone on to the green fluorescent material layer 4, light which is emitted to outside of the same fluorescent material layer without being absorbed by the fluorescent material is increased to thereby decrease the luminescence intensity of fluorescent light is decreased. On the other hand, in the event of the thickness being too thick, the probability of fluorescent light being absorbed by other fluorescent materials at inner of the green fluorescent material layer 4 is increased, and the quantity of fluorescent light which is emitted to the outside of the same fluorescent material layer is decreased, whereby the luminescence intensity of fluorescent light is decreased. Consequently, since the luminescence intensity is decreased whether the thickness of the fluorescent material layer is too thick or too thin, the thickness of the fluorescent material layer is preferably set to a range from 100 µm to 300 µm and is more preferably set to a range from 150 µm to 200 µm in particular. Consequently, the thickness of the green fluorescent material layer 14 is set to 170 µm A method for preparing the fluorescent material in the green fluorescent material layer 4 will be described. To prepare this green fluorescent material, firstly, yttrium oxide ($Y_2O_3$), aluminum oxide ($Al_2O_3$), gallium oxide ($Ga_2O_3$), and cerium oxide ($CeO_2$), which are raw materials, are formulated at a molar ratio of Y:Al:Ga:Ce=2.98:3:2:0.02. Then, 50 mol % of barium fluoride relative to the raw materials is formulated into the raw materials constituting the fluorescent material as a catalyst which facilitates crystal growth. The raw materials are then contained in a polyethylene container together with ethanol, and they are mixed at a revolution speed of 200 rpm for five hours. Next, the resulting mixture is filtered and the resulting material is dried. The dried material is contained in an alumina container and is then calcined at 1500° for four hours within a 4% hydrogen reducing atmosphere. Then, finally, the resulting material is stirred for one hour in 2-N nitric acid solution to remove the catalyst and other impurities, and the resulting material is washed with pure water and is then dried, whereby a green fluorescent material is produced.

The light emitting device 74 is configured as a red light source such as a red light emitting diode which emits light in a red wavelength band. And, this red light source is disposed in a position lying between the excitation light sources 72 and the fluorescent wheel 71 so that an optical axis direction of excitation light when it is emitted from the excitation light sources 72 and an optical axis of light emitted from the red light source becomes parallel to each other.

In addition, the light guiding optical system includes a mirror group 151 which is made up of a plurality of mirrors, a convex lens group 153 which is made up of a plurality of convex lenses, a light gathering lens group 155 which is made up of light gathering lenses each of which is made by a combination of convex lenses and meniscus lenses, and a light guiding device incident lens 154.

The mirror group 151 includes a primary mirror 151a which is disposed in a position where an optical axis of excitation light which is reflected on the reflecting mirror group 150 and an optical axis of the light emitting device 74 intersect each other at right angles, a secondary mirror 151b which is disposed in a position which is situated on a rear surface side of the fluorescent wheel 71 and where an extension of an axis of the light guiding device 75 and an extension of the optical axis of the excitation light which is reflected on the reflecting mirror group 150 intersect each other at right angles, a tertiary mirror 151c which is disposed on the optical axis of the red light source and a quaternary mirror 151d which is disposed in a position where an optical axis of light in a red wavelength band which is reflected on the tertiary mirror 151c and the extension of the axis of the light guiding device 75 intersect each other at right angles.

The primary mirror 151a is configured as a dichroic mirror which allows for passage of light emitted from the excitation light sources 72 and the red light source and reflects fluorescent light emitted in the fluorescent wheel 71. In addition, the secondary mirror 151b is configured as a reflecting mirror which makes the optical axis of light which is emitted from the excitation light sources 72 and which then is transmitted through the fluorescent wheel 71 while being diffused the axis of the light guiding device 75 coincide with each other. The tertiary mirror 151c is configured as a reflecting mirror which reflects light emitted from the red light source and fluorescent light which is emitted in the fluorescent wheel 71 towards the quaternary mirror 151d. The quaternary mirror 151d is configured as a dichroic mirror which allows for passage of light beam reflected by the secondary mirror 151b and reflects light beam reflected by the tertiary mirror 151c.

In addition, the convex lens group 153 as the light guiding optical system includes a primary convex lens 153a which is disposed between the excitation light sources 72 and the primary mirror 151a, a secondary convex lens 153b which is disposed between the secondary mirror 151b and the quaternary mirror 151d, a tertiary convex lens 153c which is disposed between the primary mirror 151a and the tertiary mirror 151c, and a quaternary convex lens 153d which is disposed between the tertiary mirror 151c and the quaternary mirror 151d.

Further, the light gathering lens group 155, as the light guiding optical system is disposed in proximity to the red light source and in proximity to both front and rear surfaces of the fluorescent wheel 71 on an optical axis of light emitted from the excitation light sources 72 for gathering light emitted from the red light source and the fluorescent wheel 71. In addition, the light guiding device incident lens 154 as the light guiding optical system is disposed in proximity to the light guiding device 75 for gathering light emitted from the light source unit 63 to the incident plane of the light guiding device 75.

Then, in the light source unit 63 configured as described above, blue laser light emitted from the excitation light sources 72 and reflected on the reflecting mirror group 150 is gathered by the primary convex lens 153a. Thereafter, the light gathered transmits through the primary mirror 151a and is shone on to the fluorescent reflecting area and the diffuse transmission area on the fluorescent wheel 71 by the light gathering lens system 155.

In addition, light beams emitted from the excitation light sources 72 and shone on to the green fluorescent material layer 4 on the fluorescent emitting area 2 excite the fluorescent material as excitation light, and the fluorescent material so excited then emits light in a predetermined wavelength band. Further, light beams emitted from the excitation light sources 72 and shone on to the diffuse transmission area on the fluorescent wheel 71 are diffused and are then converted in nature from coherent light having strong directivity into incoherent light having weak directivity and then is emitted from the rear surface side of the fluorescent wheel 71 as light in a blue wavelength band of the incoherent light.

Additionally, light in a red wavelength band which is emitted from the red light source is gathered by the light gathering lens group 155 and passes through the primary mirror 151a. light emitted from the fluorescent wheel 71 towards the excitation light sources 72 is gathered by the light gathering lens group 155 so as to be shone on to the primary mirror 151a. Then, the light in a red wavelength band that has been transmitted through the primary mirror 151a and the fluorescent light that has been reflected on the primary mirror 151a are gathered by the tertiary convex lens 153c and the quaternary convex lens 153d and are reflected on the tertiary mirror 151c and the quaternary mirror 151d and are then gathered onto the incident plane of the light guiding device 75 by the light guiding unit incident lens 154 to thereby be incident or enter an interior of the light guiding device 75.

Further, the light in a blue wavelength band that has been transmitted through the fluorescent wheel 71 while being diffused is gathered by the light gathering lens group 155 so as to be shone on to the secondary mirror 151b. The light in a blue wavelength band is then reflected on the secondary mirror 151b, is gathered by the secondary convex lens 153b and been transmitted through the quaternary mirror 151d. Thereafter, the light in a blue wavelength band is gathered onto the incident plane of the light guiding device 75 by the light guiding device incident lens 154 to enter the light guiding device 75 which is a light tunnel or a glass rod called a light smoothing or guiding rod.

Then, the light source light that has entered into the light guiding device 75 is made into light beam whose luminescent intensity is distributed uniformly in the light guiding device 75 and is then shone on to the optical axis varying mirror 76. The light source light is then reflected on the optical axis varying mirror 76, enters into the image generation block 79 of the optical system unit 70, is converted into projection light at the display device 51 to enter into the projection side optical system 90 and is enlarged at the projection side optical system 90 for projection of an image on to the screen.

In the green fluorescent material layer 4 of the light source unit 63 of the embodiment, in the event that light emitted from the excitation light sources 72 is shone on to the green fluorescent material layer 4, the concentration of weight content of the green fluorescent material in the green fluorescent material layer 4 is determined so that the luminescence intensity of fluorescent light is increased. Hence, the quantity of fluorescent light can be increased without increasing the quantity of light emitted from the excitation light sources 72. In addition, since the quantity of fluorescent light absorbed within the fluorescent material layer can be decreased, the utilization efficiency of fluorescent light can also be increased.

In addition, in the light source unit 63 of the embodiment, the concentration of weight content of the green fluorescent material contained in the green fluorescent material layer 4 is set to the range from 60% to 85%. By setting the concentration of weight content of the fluorescent material contained to the slightly wider range, the fluorescent material layer can be formed by studying in detail a balance between costs involved in formulation of the fluorescent material layer and the quantity of fluorescent light.

By using the solid-state light emitting devices which emit light in a blue wavelength band as the excitation light sources 72, light emitted from the excitation light sources 72 can be used as excitation light, and the light emitted from the excitation light sources 72 can also be used as light source light in a blue wavelength band. Therefore, there is no need to prepare a blue fluorescent material layer and blue light sources separately, and it is to possible to aim to downsize the light source unit 63.

In addition, in the green fluorescent material layer 4 of the light source unit 63 of the embodiment, in the event that light emitted from the excitation light sources 72 is shone on to the green fluorescent material layer 4, the thickness of the green fluorescent material layer 4 is determined so that the luminescence intensity of fluorescent light is enhanced. Hence, the quantity of fluorescent light can be increased without increasing the quantity of light emitted from the excitation light sources 72. In addition, since excitation light is shone on to the fluorescent material without any loss, the utilization efficiency of fluorescent light can also be enhanced.

Further, in the light source unit 63 of the embodiment, the thickness of the green fluorescent material layer 4 is set to the range from 100 μm to 300 μm. In this way, by setting the thickness of the fluorescent material layer to the slightly wider range, the fluorescent material layer can be formed by studying in detail the balance between costs involved in formulation of the fluorescent material layer and the quantity of fluorescent light and a balance with the concentration of weight content of the fluorescent material contained in the fluorescent material layer.

In addition, by setting the concentration of weight content of the green fluorescent material in the green fluorescent material layer 4 to the range from 70% to 80%, as is shown in FIG. 6, the green fluorescent material layer 4 has the concentration of weight content of the fluorescent material with the highest luminescence intensity. Therefore, the utilization efficiency of fluorescent light can be enhanced.

Further, by setting the thickness of the green fluorescent material layer 4 to the range from 150 μm to 200 μm, as is shown in FIG. 6, the green fluorescent material layer 4 has the thickness with the highest luminescence intensity. Therefore, the absorption of fluorescent light within the green fluorescent material layer 4 is suppressed to a minimum level. In addition, in the excitation light shone on to the green fluorescent material layer 4, the quantity of light that is not shone onto the green fluorescent material and is emitted to outside thereof can be decreased, thereby being possible to enhance the utilization of excitation light.

By using the cerium-activated garnet phosphor which is a substance having high luminescence intensity relative to excitation light in a blue wavelength band, as the green fluorescent material in the green fluorescent material layer 4, the quantity of light in a green wavelength band can be increased.

In addition, by using the blue laser diodes as the excitation light sources 72, the light in a blue wavelength band having high energy and high directivity can be shone on to the fluorescent wheel 71, thereby being possible to excite the green fluorescent material efficiently. Further, by the light source light being dispersed in the fluorescent wheel 71, the light source light in a blue wavelength band can easily be produced.

Further, the light source unit 63 of the embodiment includes the red light emitting diode as the light emitting device 74, which is independent, for generation of light in a red wavelength band. Hence the light source unit 63 in that way, there can be provided the light source unit 63 which can emit light in a red wavelength band large light quantity and high lightness.

By using the light source unit 63 configured as described heretofore in the projector 10, there can be provided the projector 10 which enables a projection of a projection image which is high in luminance and high lightness.

Figure 8:
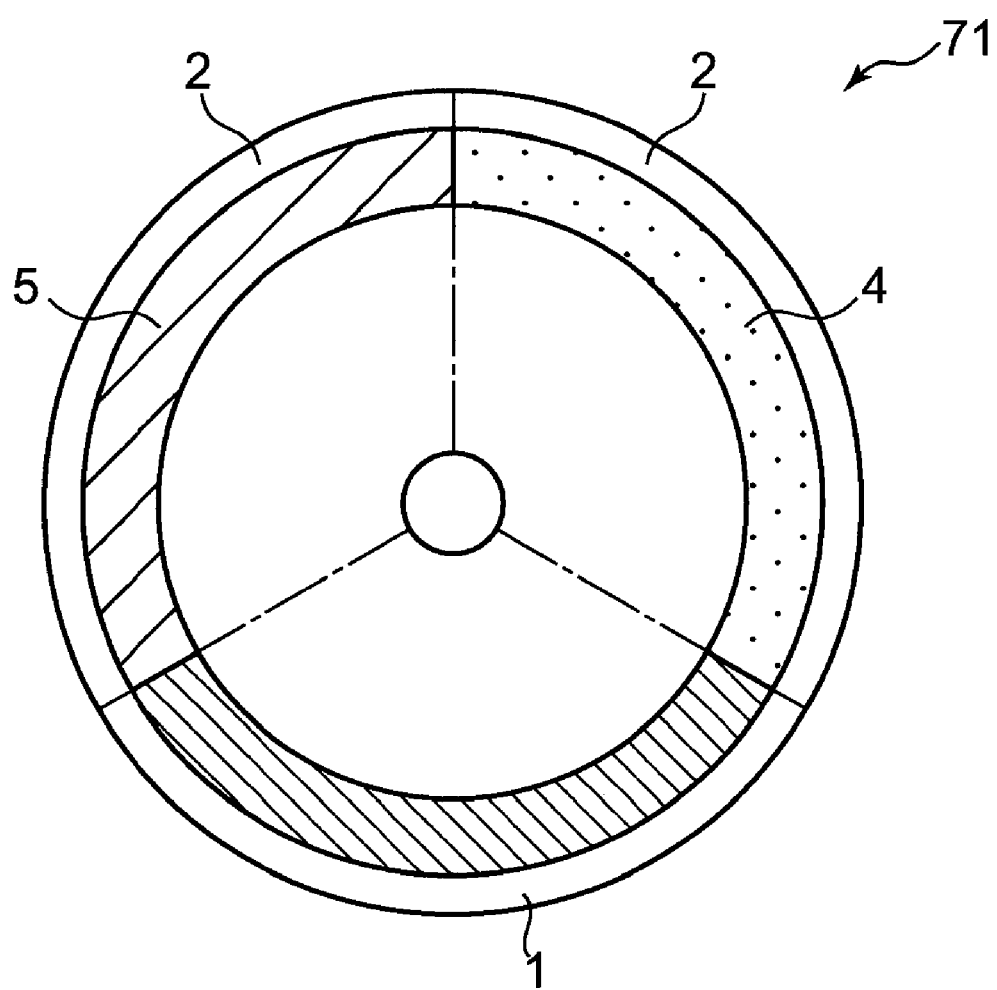
FIG. 8 is an explanatory front view of a fluorescent wheel according to a modified example of the invention.

In the above-described embodiment, while the independent light emitting device 74 is provided for the color of red, as is shown in FIG. 8, a configuration can also be applied in which a fluorescent wheel 71 includes a fluorescent emitting area 2 including, in turn, a red fluorescent material layer 5 and a green fluorescent material layer 4 and a diffuse transmission area 1 which are disposed end to end in a circumferential direction, so that light beams in a red, green and blue wavelength bands can be produced by the fluorescent wheel 71.

In this way, in the event that the configuration is applied in which light beams in a red, green and blue wavelength bands are produced by the fluorescent wheel 71, an europium-activated nitride fluorescent material can be used for a red fluorescent material in the red fluorescent material layer 5. In addition, as to concentration of weight content and thickness of a fluorescent material layer of the red fluorescent material layer 5, as well as with the green fluorescent material layer 4 of the embodiment, a luminescence intensity is obtained by experiments and a concentration of weight content and thickness by which the luminescence intensity is increased are determined based on the results of the experiments, whereby there can be provided the light source unit 63 which can emit light in a red wavelength band large quantity and high lightness.

A method for preparing the europium-activated nitride phosphor will be described below. Firstly, strontium nitride ($Nr_3N_2$) calcium nitride ($Ca_3N_2$), aluminum nitride (AlN), silicon nitride ($Si_3N_4$) and europium oxide ($Eu_2O_3$), which are raw materials for the europium-activated nitride fluorescent material, are formulated at a molar ratio of Sr:Ca:Al:Si:Eu=0.75:0.25:1.0:1.0:0.015 within a nitrogen atmosphere and are mixed in a planetary ball mill. Then, the mixed raw materials are contained in a container of boron nitride and are calcined under nine atmospheric pressures at 1900 degrees within a nitrogen atmosphere for four fours, whereby an europium-activated nitride phosphor can be produced.

In addition, in the above-described way, in the light source unit 63 in the configuration is applied in which light beams in red, green and blue wavelengths bands are generated, by that the primary mirror 151a is configured as a dichroic mirror with properties of transmitting through blue light and reflecting red and green light, it is possible to gather the light beams in red, green and blue wavelengths bands on an incident plane of the light guiding device 75.

The invention is characterized in that values of the concentration of weight content and thickness of the fluorescent material in the fluorescent material layer at which the luminescence intensity becomes highest are obtained from the experiment data, and the concentration of weight content and thickness of the fluorescent material are determined based on the values obtained. Consequently, the invention is not limited to the embodiment described above but can be modified or improved freely without departing from the spirit and scope thereof.

In addition, the invention is not limited to the embodiments that have been described above, and hence, the invention can be modified variously without departing from the spirit and scope of the invention when it is carried out. Additionally, the functions which are executed in the aforesaid embodiments may be combined together to an extreme extent for execution thereof. Various approaches for varying the direction of the optical axis are included in the embodiments that have been described above, and inventions can be extracted variously depending upon appropriate combinations of the plurality of disclosed constituent features. For example, provided that the advantage can still be obtained even in the event that some constituent features are deleted from the whole constituent features descried in the embodiments, such a configuration from which those constituent features are deleted can be extracted as an invention.

What is claimed is:

1. A light source unit comprising:
an excitation light source for emitting light in a predetermined wavelength band and a fluorescent plate comprising at least one or more fluorescent material layers for emitting fluorescent light in a predetermined wavelength band using light emitted from the excitation light source as excitation light, wherein
the fluorescent material layer is formed of a fluorescent material and a binder, wherein
at least a green fluorescent material layer is formed on the fluorescent plate as the fluorescent material layer, and wherein
a concentration of weight content of a green fluorescent material contained in the green fluorescent material layer is in the range from 60% to 85%.

2. A light source unit as set forth in claim 1, wherein the excitation light source is a solid-state light emitting device which emits light in a blue wavelength band.

3. A light source unit as set forth in claim 1, wherein the thickness of the green fluorescent material layer in the fluorescent material layer is in the range from 100 μm to 300 μm.

4. A light source unit as set forth in claim 1, wherein the concentration of weight content of the green fluorescent material in the green fluorescent material layer relative to the fluorescent material layer is in the range from 70% to 80%.

5. A light source unit as set forth in claim 1, wherein the thickness of the green fluorescent material layer in the fluorescent material layer is in the range from 150 μm to 200 μm.

6. A light source unit as set forth in claim 1, wherein the green fluorescent material in the green fluorescent material layer is a cerium-activated garnet phosphor, with a peak of a wavelength of fluorescent light being in the range from 520 nm to 540 nm.

7. A light source unit as set forth in claim 1, wherein the excitation light source is a blue laser diode which emits light in a blue wavelength band of which a peak of a wavelength is in the range from 430 nm to 460 nm.

8. A light source unit as set forth in claim 1, wherein
the fluorescent plate is configured as a fluorescent wheel in which a segment where the green fluorescent material layer is disposed and a segment functioning as a diffusing area where light emitted from the excitation light source is converted into diffuse light whose directivity is weak are disposed end to end in a circumferential direction, and having a red light emitting diode functioning as a light emitting device which emits light in a red wavelength band and including a light guiding optical system which guides fluorescent light and diffuse light which are emitted from the fluorescent wheel and light emitted from the light emitting device to a predetermined plane.

9. A light source unit as set forth in claim 1, wherein
the fluorescent plate is configured as a fluorescent wheel in which a segment functioning as a fluorescent area which is made up of the green fluorescent material layer and a red fluorescent material layer which receives excitation light from the excitation light source to emit fluorescent light in a red wavelength band and a segment functioning as a diffuse area where light emitted from the excitation light source is converted into diffuse light whose directivity is weak are disposed end to end in a circumferential direction, and having a light guiding optical system which guides fluorescent light and diffuse light which are emitted from the fluorescent wheel to a predetermined plane.

10. A projector comprising:
a light source unit as set forth in claim 1, the light source unit being disposed so that light source light is gathered on to an incident plane of a light guiding device;
a display device;
a light source side optical system for guiding light from the light source unit which has been transmitted through the light guiding device to the display device;
a projection side optical system for projecting an image emitted from the display device on to a screen; and
a projector control means for controlling the light source unit and the display device.

* * * * *